(12) United States Patent
Harada et al.

(10) Patent No.: US 8,709,658 B2
(45) Date of Patent: Apr. 29, 2014

(54) NEGATIVE ELECTRODE MATERIAL FOR NON-AQUEOUS ELECTROLYTE SECONDARY BATTERY, METHOD FOR MANUFACTURING NEGATIVE ELECTRODE MATERIAL FOR NON-AQUEOUS ELECTROLYTE SECONDARY BATTERY, NON-AQUEOUS ELECTROLYTE SECONDARY BATTERY, AND BATTERY PACK

(75) Inventors: Yasuhiro Harada, Yokohama (JP); Norio Takami, Yokohama (JP); Hiroki Inagaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/238,853

(22) Filed: Sep. 21, 2011

(65) Prior Publication Data

US 2012/0070717 A1   Mar. 22, 2012

Related U.S. Application Data

(63) Continuation of application No. PCT/JP2009/069504, filed on Nov. 17, 2009.

(30) Foreign Application Priority Data

Mar. 25, 2009  (JP) ................................. 2009-073122

(51) Int. Cl.
   *H01M 4/13*   (2010.01)
   *H01M 4/58*   (2010.01)

(52) U.S. Cl.
   USPC .................. 429/231.5; 429/218.1; 252/182.1

(58) Field of Classification Search
   None
   See application file for complete search history.

(56) References Cited

U.S. PATENT DOCUMENTS

| | | | |
|---|---|---|---|
| 5,464,708 A | | 11/1995 | Neat et al. |
| 6,040,087 A | * | 3/2000 | Kawakami ................. 429/218.1 |
| 7,094,499 B1 | * | 8/2006 | Hung ......................... 429/231.8 |
| 8,003,255 B2 | | 8/2011 | Inagaki et al. |
| 2003/0113624 A1 | * | 6/2003 | Kim et al. ..................... 429/213 |
| 2007/0065725 A1 | * | 3/2007 | Inoue et al. ................... 429/232 |
| 2009/0053605 A1 | | 2/2009 | Harada et al. |
| 2009/0202912 A1 | * | 8/2009 | Baba et al. ............... 429/231.95 |

FOREIGN PATENT DOCUMENTS

| | | | |
|---|---|---|---|
| JP | 7-500220 | 1/1995 | |
| JP | 2005-78991 | 3/2005 | |
| JP | 2006-93037 | 4/2006 | |
| JP | 2006-260887 | 9/2006 | |
| JP | 2007-234358 | 9/2007 | |
| JP | 2008-123787 | 5/2008 | |
| WO | WO 2007/135790 | * 11/2007 | ............ H01M 10/36 |

OTHER PUBLICATIONS

International Search Report issued Dec. 22, 2009 in PCT/JP2009/069504 filed Nov. 17, 2009.

* cited by examiner

*Primary Examiner* — Cynthia K. Walls
(74) *Attorney, Agent, or Firm* — Oblon, Spivak, McClelland, Maier & Neustadt, L.L.P.

(57) ABSTRACT

According to one embodiment, a non-aqueous electrolyte secondary battery includes a positive electrode which inserts and extracts lithium, a negative electrode containing a negative electrode material including a porous conductive particle and an active material formed on the surface and/or within the pores of the porous conductive particle and composed of a lithium titanium complex oxide having at least one structure selected from the group consisting of nanotubes and nanowires, the lithium titanium complex oxide being expressed by a general formula $Li_xTiO_2$ (where $0 \leq x < 1$), and a non-aqueous electrolyte.

14 Claims, 7 Drawing Sheets

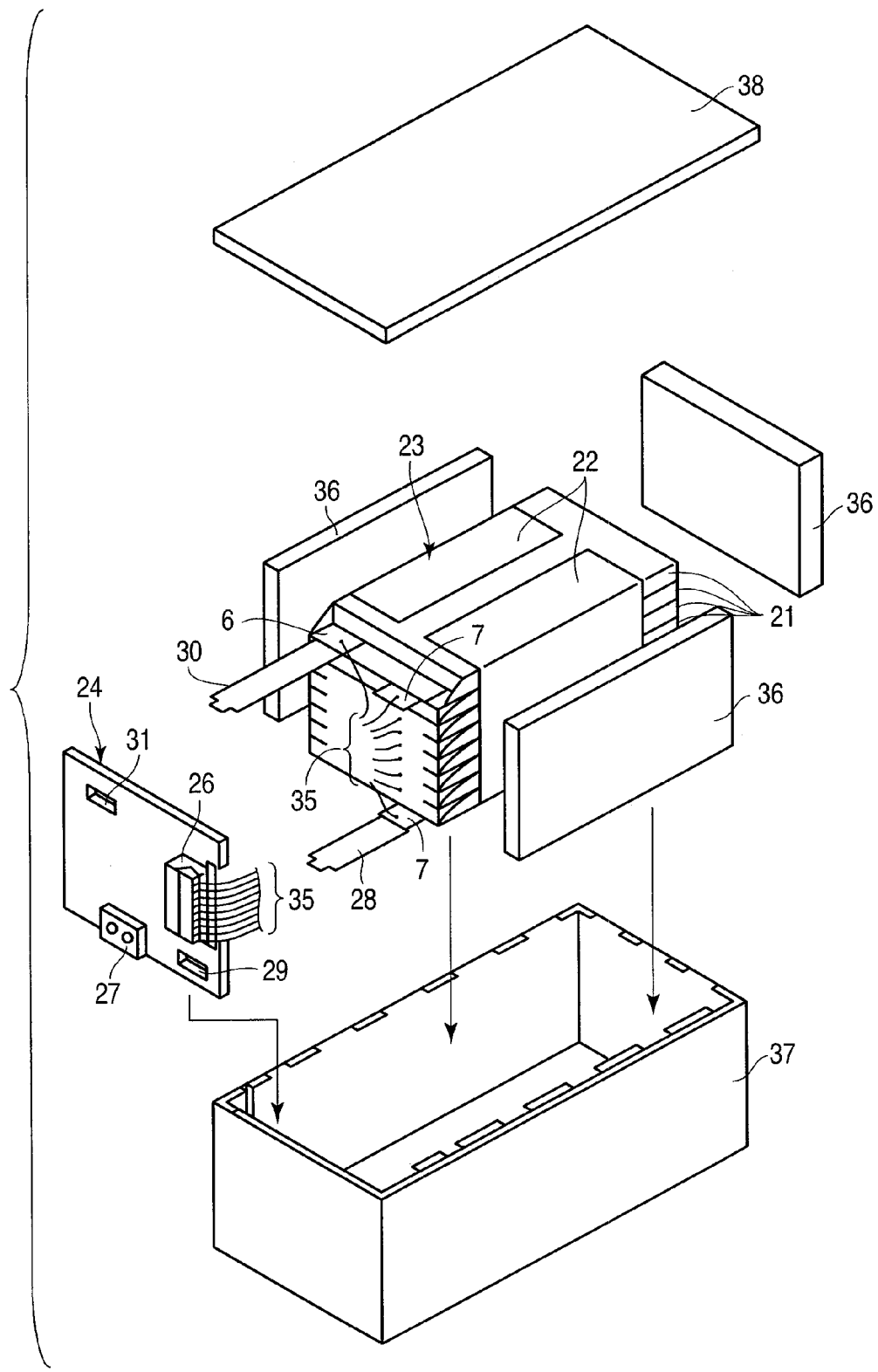
F I G. 5

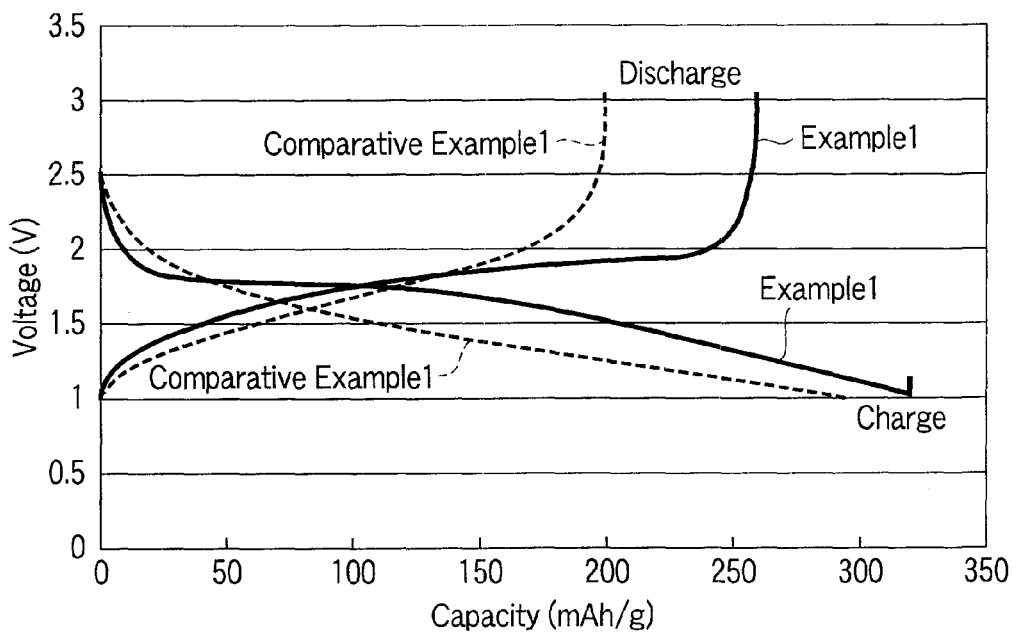
F I G. 10
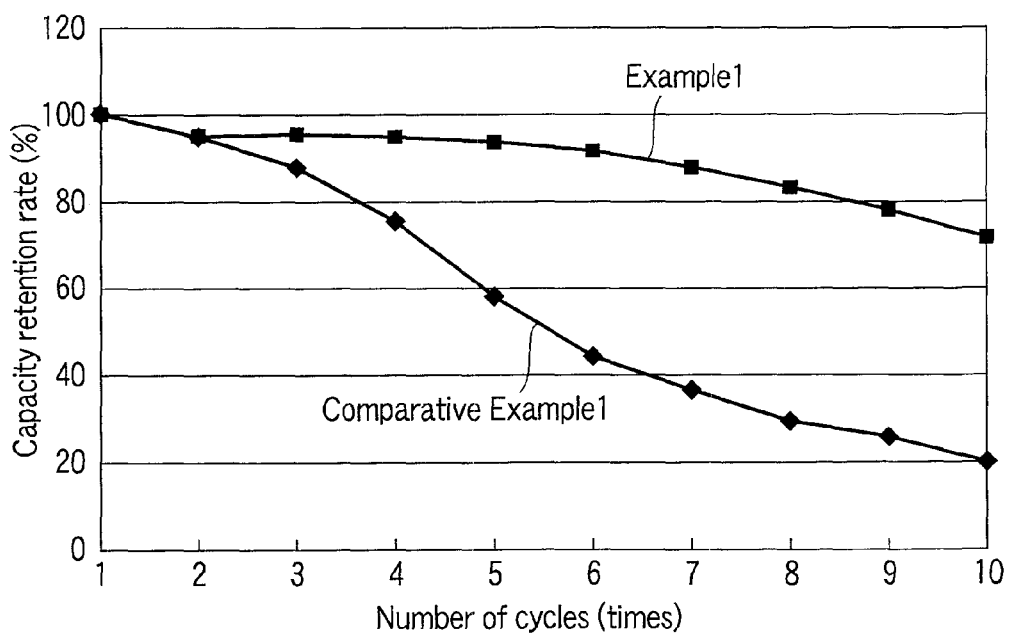
F I G. 11

NEGATIVE ELECTRODE MATERIAL FOR NON-AQUEOUS ELECTROLYTE SECONDARY BATTERY, METHOD FOR MANUFACTURING NEGATIVE ELECTRODE MATERIAL FOR NON-AQUEOUS ELECTROLYTE SECONDARY BATTERY, NON-AQUEOUS ELECTROLYTE SECONDARY BATTERY, AND BATTERY PACK

CROSS REFERENCE TO RELATED APPLICATIONS

This application is a Continuation Application of PCT Application No. PCT/JP2009/069504, filed Nov. 17, 2009 and based upon and claiming the benefit of priority from prior Japanese Patent Application No. 2009-073122, filed Mar. 25, 2009, the entire contents of all of which are incorporated herein by reference.

FIELD

Embodiments described herein relate generally to a negative electrode material for a non-aqueous electrolyte secondary battery, a method for manufacturing a negative electrode material for a non-aqueous electrolyte secondary battery, a non-aqueous electrolyte secondary battery, and a battery pack.

BACKGROUND

In recent years, lithium ion secondary batteries which charge and discharge by the transfer of lithium ions between negative and positive electrodes have been intensively studied and developed as high-energy density batteries.

Also in recent years, metal complex oxides have been noted as lithium hosts of negative electrodes. In particular, titanium oxides allow quick and stable charging and discharging because of their potential characteristics. In addition, negative electrodes containing titanium oxide as an active material have a longer life than carbon materials. However, the titanium oxides have a higher potential for metal lithium than do common carbon negative electrodes and have a lower capacity density per unit weight. Therefore, their energy densities, which are an important factor for secondary batteries, are low.

On the other hand, the electrode potential of titanium oxide is caused by the oxidation-reduction reaction between $Ti^{3+}$ and $Ti^{4+}$ during electrochemical insertion and extraction of lithium, and a potential of about 1.5V is generated with reference to metal lithium. When lithium is inserted and extracted through the use of oxidation and reduction of titanium, the electrode potential is electrochemically limited, so that it is substantially difficult to decrease the electrode potential for the purpose of increasing the energy density. Accordingly, the maximization of the theoretical electrode capacity of the titanium oxide is very important for increasing the energy density. In general, titanium oxide containing no lithium ion has poor electron conductivity, and thus must be combined with conductive additives when used as an active material. On the other hand, in order to allow smooth transfer of lithium ions in titanium oxide, atomization and improvement of the crystal form are necessary.

Under the above circumstances, there is a known technique for improving the contact area between a conductive agent and an active material; the surface of an active material is coated with a conductive agent, thereby establishing a surface contact between them. The electrode will have improved electron conductivity, but the conductive agent located on the surface of the active material, or in the channel of insertion and extraction of lithium ions hinders the transfer of lithium ions, and thus deteriorates the ion conductivity.

BRIEF DESCRIPTION OF THE DRAWINGS

FIG. 5 is an exploded perspective view of a battery pack of the fourth embodiment;

FIG. 10 shows initial charge and discharge curves of the electrochemical measurement cells of Example 1 and Comparative Example 1; and FIG. 11 shows the retention rates of discharge cycle capacity of the electrochemical measurement cells of Example 1 and Comparative Example 1.

DETAILED DESCRIPTION

Figure 1:
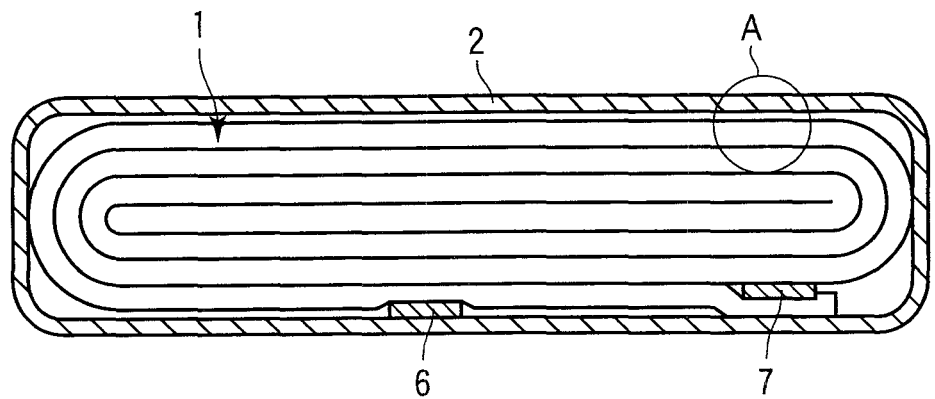
FIG. 1 is a cross-sectional view of a flat non-aqueous electrolyte secondary battery of the third embodiment.

Hereinafter, the negative electrode material for a non-aqueous electrolyte secondary battery, method for manufacturing a negative electrode material for a non-aqueous electrolyte secondary battery, non-aqueous electrolyte secondary battery, and battery pack according to the embodiments are described below with reference to drawings. Throughout these embodiments, the same reference numbers are attached to the corresponding components, and overlapping explanation thereof is omitted. The respective drawings are schematic views for promoting the explanation and understanding of the embodiment. Therefore, the shape, dimension, and ratio of the components may be different from those in actual apparatus, but their design may be appropriately changed in consideration of the below-described explanation and known techniques.

(First Embodiment)

In general, according to first embodiment, a negative electrode material for a non-aqueous electrolyte secondary battery comprises a porous conductive particle and an active material formed on the surface and/or within the pores of the porous conductive particle and composed of a lithium titanium complex oxide having at least one structure selected from the group consisting of nanotubes and nanowires, the lithium titanium complex oxide being expressed by a general formula $Li_xTiO_2$ (where $0 \leq x < 1$).

The active material exhibits a peak in the average particle size range of 1 nm or more and 10 nm or less as measured by X-ray small-angle scattering analysis using Cu-Kα radiation and having a particle size which is distributed a range of 0.01 nm or more and 30 nm or less and distributed towards the high angle side with reference to the peak position in a particle size distribution. The data from the X-ray small-angle scattering analysis are analyzed using the origin scattering strength I (0) and radius of gyration Rg expressed by Guinier law shown in the formula (1).

$$I(S) \cong I(0)\exp\left[-\frac{4\pi^2}{3}Rg^2S^2\right] \quad (1)$$

The formula (2) is obtained by taking logarithms of both sides of the formula (1).

$$\ln[I(S)] = \ln[I(0)] - \frac{4\pi^2}{3}Rg^2S^2 \quad (2)$$

When the $S^2$ and ln $[I(S)]$ in the formula (2) are plotted as abscissa and ordinate, respectively, a linear region appears. The radius of gyration Rg is determined from the gradient of the linear region and I (0) is determined from the intercept on the Y axis. The plot of ln $[I(S)]$ corresponding to $S^2$ is specifically called a Guinier plot. In the present application, the particle size distribution analysis was carried out using NANO-Solver manufactured by Rigaku Corporation as the analyzing software.

The porous conductive particle is made of, for example, a carbon or ceramic material. Examples of the ceramic material include oxide ceramic which has been conductive-coated with conductive titanium oxide, and non-oxide ceramic such as carbide, boride, and nitride. Considering conductive polymers are widely studied, a lighter material of conductive polymer having high electron conductivity would be suitable as the porous conductive particle may be found. However, there is a limit on the burning temperature of conductive polymers in the active material immersion process in the below-described production method.

The porous conductive particle is preferably made of carbon or conductive oxide, because these materials are suitable for the industrial production of mesoporous conductive particle.

Examples of the carbon include activated carbon and carbon black having a high specific surface area. Examples of the conductive oxide include conductive titanium oxide and zeolite-supported oxides having electron conductivity.

The carbon black is generally composed of non-spherical unique particle which is used in catalysts, and is preferably composed of hollow shell particle thinly covered with graphite crystal. The carbon black has a pore diameter of approximately several nanometers to several tens of nanometers, and has a large surface area and absorbs a large amount of oil. In addition, the carbon black has a high conductivity, and thus is particularly suitable to the porous conductive particle of the first embodiment.

The porous conductive particle preferably has an average particle size of 10 μm or more and 50 μm or less.

The porous conductive particle preferably has a porosity of 60 vol % or more and 95 vol % or less, and more preferably 80 vol % or more and 95 vol % or less. The nanotubes or nanowires preferably have an average diameter of 5 nm or more and 50 nm or less.

The content of the active material formed on the surface and/or within the pores of the porous conductive particle is preferably 60% by weight or more and 90% by weight or less, and more preferably 70% by weight or more and 80% by weight or less, based on the total weight of the porous conductive particle and the active material. If the content of the active material amount is more than 90% by weight, the active material layer formed on the surface of the porous conductive particle has a too large thickness. On the other hand, if the content of the active material amount is less than 60% by weight, it is difficult to increase the density of the negative electrode layer containing the active material.

The negative electrode material of the first embodiment preferably has a specific surface area of 200 $m^2/g$ or more and 400 $m^2/g$ or less as measured by the BET method.

The specific surface area is measured by allowing molecules having a known adsorption occupying area to adsorb to the surface of particle at a temperature of liquid nitrogen, and the specific surface area of the sample is determined from the amount of adsorption. The most common method is the BET method based on physical adsorption of an inactive gas at low temperature and low humidity. The BET method is the most famous theory for calculating the specific surface area, and is an extension of the Langmuir theory, which is a theory for monolayer molecular adsorption, to multilayer molecular adsorption. The specific surface area thus determined is referred tows the BET specific surface area.

The negative electrode material of the first embodiment preferably has a tap density of 0.3 $g/cm^3$ or more, thereby improving the electrode density. In addition, in order to keep the form of nanotubes or nanofibers, the upper limit of the tap density is preferably 0.9 $g/cm^3$ or more and 1.1 $g/cm^3$ or less.

The tap density and bulk density may be measured by the method described in ASTM B-527-06. In this case, the measuring apparatus may be, for example, Dual Autotap (Quantacrome corp.) or Tap Pack Volumeter (Sahndon Southern Instruments Inc.). The powder to be measured is charged into a specific vessel by free fall, and the bulk density and tap density are calculated by the following formulae, where M, V, and N represent the mass (g), volume ($cm^3$) and volume after tapping ($cm^3$), respectively:

Bulk density=M/V ($g/cm^3$)

Tap density–M/N ($g/cm^3$)

According to the first embodiment described above, there is provided a negative electrode material for a non-aqueous electrolyte secondary battery which exhibits an electrode potential of 1.5 V or near 1.5 V with reference to lithium, which is equivalent to that of a titanic acid-based material, and has a higher energy density than the material.

More specifically, the negative electrode material for a non-aqueous electrolyte secondary battery comprises a porous conductive particle and an active material formed on the surface and/or within the pores of the porous conductive particle and composed of a lithium titanium complex oxide having at least one structure selected from the group consisting of nanotubes and nanowires, the lithium titanium complex oxide being expressed by a general formula $Li_xTiO_2$ (where $0 \le x < 1$). The nanotubes and the nanowires have three dimensional crystal structures, respectively. The active material is formed on the surface to be an electron conductivity surface and/or within the pores of the porous conductive particle. More specifically, the active material consisting of a lithium titanium complex oxide has a skeletal structure composed of titanium ion and oxide ion. The skeletal structure is arranged with the three dimensional stability and having spaces for hosting lithium ions between layers of the skeletal structure. The nanotubes or nanowires have larger contact areas with electrolytic solutions, because these have markedly smaller diameters than a particle of a bulk material with a diameter of several nanometers. Accordingly, the diffusion distance of lithium ions is reduced. In addition, the active material firmly combines to the surface and/or within pores of the porous conductive particle having electron conductivity. As a result, it can be compatible with both of the electron conductivity and lithium ion conductivity, which are important factors of an electrode. Accordingly, the negative electrode material allows more efficient insertion and extraction of lithium ions into and from the lithium ion hosting spaces in comparison with the bulk materials, and has a larger capacity owing to the virtually increased spaces for the insertion and extraction of lithium ions.

In the active material composed of a lithium titanium complex oxide having at least one structure selected from the group consisting of nanotubes and nanowires, it exhibits a peak in the average particle size range of 1 nm or more and 10 nm or less as measured by X-ray small-angle scattering analysis using Cu—Kα radiation and having a particle size which is distributed a range of 0.01 nm or more and 30 nm or less and distributed towards the high angle side with reference to the peak position in a particle size distribution. Since such an active material has a uniform average particle size and aspect ratio to give good lithium ion conductivity, and a skeletal structure composed of titanium ions and oxide ions has a more stable three dimensional arrangement, the spaces to host lithium ions can be more stably formed between layers of the skeletal structure.

The nanotubes and nanowires having a diameter of 5 nm or more and 50 nm or less have larger contact areas with electrolytic solutions, whereby the diffusion distance of lithium ions is markedly reduced.

The negative electrode material for a non-aqueous electrolyte secondary battery of the first embodiment exhibits an electrode potential of near 1.5V with reference to lithium, which is equivalent to that of a titanic acid-based material, and has a higher energy density than the material.

The negative electrode material for a non-aqueous electrolyte secondary battery having a specific surface area of 200 $m^2/g$ or more to 400 $m^2/g$ or less as measured by the BET method has an increased contact area with electrolytic solutions. Therefore, for example, the host sites for insertion and extraction of lithium ions during charge and discharge are increased, whereby more lithium ions quickly move to the host sites. As a result, it can be obtained a non-aqueous electrolyte secondary battery in which the quick charge and discharge performance and electrode capacity is further improved.

(Second Embodiment)

In general, according to second embodiment, a method for manufacturing a negative electrode material for a non-aqueous electrolyte secondary battery comprises:

dispersing porous conductive particles in a titanium alkoxide solution to prepare a dispersion;

subjecting the dispersion to reduced pressure to infiltrate the titanium alkoxide solution on the surface and/or within pores of the porous conductive particles;

hydrolyzing the titanium alkoxide after the infiltration to form porous conductive particles containing titanium gel;

burning the porous conductive particles containing titanium gel in an inert gas atmosphere to convert the titanium gel on the surface and/or within the porous of the porous conductive particles to titanium oxide;

dispersing the porous conductive particles containing titanium oxide in an alkaline solution, followed by pressurizing and heating, thereby converting the titanium oxide on the surface and/or within the porous of the porous conductive particles to a titanium oxide having at least one structure selected from the group consisting of nanotubes and nanowires; and carrying out the porous conductive particles containing titanium oxide to react with a lithium compound, thereby producing an active material formed on the surface and/or within the pores of the porous conductive particles and composed of a lithium titanium complex oxide having at least one structure selected from the group consisting of nanotubes and nanowires, the lithium titanium complex oxide being expressed by a general formula $Li_xTiO_2$ (where $0 \leq x < 1$).

That is, firstly, titanium alkoxide is diluted with any solvent to make a titanium alkoxide solution. The titanium alkoxide may be, for example, titanium tetraisopropoxide. The solvent may be, for example, ethanol or 2-propanol.

Subsequently, porous conductive particles having an average particle size of, for example, 10 μm or more and 50 μm or less are dispersed in a titanium alkoxide solution to prepare dispersion.

The porous conductive particles may be prepared from the material described in the first embodiment.

When the surface of the porous conductive particles is hydrophilic, the solvent is preferably ethanol, while when the surface is hydrophobic, the solvent is preferably 2-propanol, thereby achieving good wettability of the particles for the solvent.

The preparation of the dispersion may include stirring or ultrasonic vibration, thereby uniformly dispersing the porous conductive particles in the titanium alkoxide solution.

Thereafter, the dispersion is subjected to reduced pressure to infiltrate the titanium alkoxide solution on the surface and/or within pores of the porous conductive particles. Subsequently, a mixed solution of pure water and ethanol (ethanol concentration: 20 to 50 wt %) is dropped on the dispersion to hydrolyze titanium alkoxide, thereby forming porous conductive particles containing titanium gel. After removing the excess portion of alkoxide by filtration, the titanium gel on the surface and/or within the porous of the porous conductive particles is converted to titanium oxide under heating in an inert gas atmosphere. The inert gas may be, for example, a noble gas such as nitrogen or argon gas. The heating temperature is preferably 400° C. or higher and 600° C. or lower. If the heating temperature is lower than 400° C., the crystallinity deteriorates, and the negative electrode containing the negative electrode material thus obtained may have a low charge and discharge efficiency. On the other hand, if the heating temperature is higher than 600° C., rutile titanium dioxide with a low charge and discharge capacity may be generated.

Subsequently, the porous conductive particles containing titanium oxide are dispersed in an alkaline solution to subject to hydrothermal treatment. The hydrothermal treatment may be carried out by any known method. The alkaline solution may be, for example, a sodium hydroxide aqueous solution or a lithium hydroxide aqueous solution. The porous conductive particles containing titanium oxide dispersed in an alkali are pressurized and heated using, for example, an autoclave pressure vessel, or subjected to hydrothermal synthesis treatment at high temperature and pressure. At this time, titanium oxide having at least one structure selected from the group consisting of nanotubes and nanowires is formed on the surface and/or within the porous of the porous conductive particles. In this manner, the use of $TiO_2$, which has been combined with carbon, reduces the secondary aggregation of raw material particles and provides fine particles with uniform size in comparison with a method using $TiO_2$ particles alone as raw material. As a result, nanotubes having a sharp particle size distribution are obtained.

Subsequently, the porous conductive particles containing titanium oxide having at least one structure selected from the group consisting of nanotubes and nanowires is washed with pure water. The water washing is carried out for removing the alkali metal ions of sodium or lithium contained in the alkaline solution. When lithium hydroxide is used, it is preferred that the water washing process be omitted thereby intentionally leaving lithium ions, and omitting the subsequent treatment process.

The porous conductive particles containing titanium oxide are dispersed in an organic solvent such as N-methylpyrrolidone. Thereafter, a binder such as polyvinylidene difluoride (PVdF) is added to prepare a paste, and the paste is applied to a metal foil to produce an electrode. Subsequently, lithium ions are electrochemically inserted, and thus producing an active material composed of a lithium titanium complex oxide expressed by a general formula $Li_xTiO_2$ (where $0 \leq x < 1$).

Alternatively, the porous conductive particles containing titanium oxide having at least one structure selected from the group consisting of nanotubes and nanowires are dispersed in pure water, and being allowed to react with a lithium compound. As a result, a negative electrode material for a non-aqueous electrolyte secondary battery which comprises porous conductive particles and an active material formed on the surface and/or within the pores of each of the porous conductive particles and composed of a lithium titanium complex oxide having at least one structure selected from the group consisting of nanotubes and nanowires, is manufactured. The lithium titanium complex oxide is expressed by a general formula $Li_xTiO_2$ (where $0 \leq x < 1$). The lithium compound is not particularly limited to lithium chloride, lithium hydroxide, or lithium carbonate, and is preferably lithium chloride or lithium hydroxide. These lithium compounds are preferred because they facilitate the adsorption to the surface of titanium dioxide in an aqueous solution.

The negative electrode material thus obtained is subsequently subjected to water washing and drying. Since the dried negative electrode material contains crystal water, it may be heated for dehydration at 400° C. or more to 800° C. or less.

The method according to the second embodiment manufactures a negative electrode material which has the above-described characteristics, and includes a porous conductive particle and an active material formed on the surface and/or within the pores of the porous conductive particle and composed of a lithium titanium complex oxide having at least one structure selected from the group consisting of nanotubes and nanowires, the lithium titanium complex oxide being expressed by a general formula $Li_xTiO_2$ (where $0 \leq x < 1$).

According to the method of the second embodiment, the active material composed of a lithium titanium complex oxide having at least one structure selected from the group consisting of nanotubes and nanowires exhibits a peak in the average particle size range of 1 nm or more and 10 nm or less as measured by X-ray small-angle scattering analysis using Cu—Kα radiation and having a particle size which is distributed a range of 0.01 nm or more and 30 nm or less and distributed towards the high angle side with reference to the peak position in a particle size distribution. In addition, a negative electrode material having a high specific surface area of, for example, 200 $m^2/g$ or more to 400 $m^2/g$ or less as measured by the BET method, and a tap density of 0.3 $g/cm^3$ or more is manufactured.

(Third Embodiment)

In general, according to third embodiment, a non-aqueous electrolyte secondary battery comprises:
a positive electrode which inserts and extracts lithium;
a negative electrode containing a negative electrode material comprising a porous conductive particle and an active material formed on the surface and/or within the pores of the porous conductive particle and composed of a lithium titanium complex oxide having at least one structure selected from the group consisting of nanotubes and nanowires, the lithium titanium complex oxide being expressed by a general formula $Li_xTiO_2$ (where $0 \leq x < 1$); and
a non-aqueous electrolyte.

The non-aqueous electrolyte secondary battery of the third embodiment includes an outer container. The positive electrode, negative electrode, and separator are contained in the outer container. The non-aqueous electrolyte is contained in the outer container.

The outer container, negative electrode, non-aqueous electrolyte, positive electrode, and separator are further described below.

1) Outer Container

The outer container is formed of a container made of a laminate film having a thickness of 0.5 mm or less, or a metal vessel having a thickness of 1.0 mm or less. The metal vessel more preferably has a thickness of 0.5 mm or less.

Examples of the shape of the outer container include flat (thin-type), square, cylinder, coin, and button. The outer container may be selected according to the size of the battery, and examples thereof include outer containers for small batteries mounted on portable electronic devices, and outer containers for large batteries mounted on two- to four-wheel vehicles.

The laminate film is a multilayer film composed of a metal layer sandwiched between resin films. The metal layer is preferably an aluminum foil or an aluminum alloy foil so as to reduce the weight of the battery. The resin film may be made of, for example, a polymer material such as polypropylene (PP), polyethylene (PE), nylon, or polyethylene terephthalate (PET). The laminate film may be formed into the shape of the outer container by heat sealing.

The metal vessel is made of, for example, aluminum or an aluminum alloy. The aluminum alloy preferably contains magnesium, zinc, silicon, or other element. The content of the transition metal such as iron, copper, nickel, or chromium in the aluminum or aluminum alloy is preferably 100 ppm by weight or less.

2) Negative Electrode

The negative electrode comprises a collector, and a negative electrode layer formed at least one surface of the collector and containing a negative electrode material and a binder.

The negative electrode material has the same structure as that described in the first embodiment, more specifically, includes porous conductive particles and an active material formed on the surface and/or within the pores of the porous conductive particles and composed of a lithium titanium complex oxide having at least one structure selected from the group consisting of nanotubes and nanowires, the lithium titanium complex oxide being expressed by a general formula $Li_xTiO_2$ (where $0 \leq x < 1$). The active material in the negative electrode material preferably exhibits a peak in the average particle size range of 1 nm or more and 10 nm or less as measured by X-ray small-angle scattering analysis using Cu—Kα radiation and having a particle size which is distributed a range of 0.01 nm or more and 30 nm or less and distributed towards the high angle side with reference to the peak position in a particle size distribution. The negative electrode material preferably has a specific surface area of 200 m²/g or more and 400 m²/g or less as measured by the BET method. The negative electrode material preferably has a tap density of 0.3 g/cm³ or more.

Examples of the binder include polytetrafluoroethylene (PTFE), polyvinylidene fluoride (PVdF), fluorine rubber, and styrene butadiene rubber.

The content of the binder in the negative electrode layer is preferably 2% by weight or more and 30% by weight or less. If the content of the binder is less than 2% by weight, bonding between the negative electrode layer and collector may deteriorate, so that the deterioration of cycling characteristics is taken place. On the other hand, in order to increase the capacity, the content of the binder is preferably 30% by weight or less.

A conductive agent may be added as necessary for improving the collecting performance and reducing the contact resistance of the negative electrode layer to the collector. The content of the conductive agent in the negative electrode layer is preferably 30% by weight or less.

The collector is made of a material which is electrochemically stable at potentials at which lithium is inserted and extracted in the active material of the negative electrode material. The collector is preferably made of copper, nickel, stainless steel, or aluminum. The average thickness of the collector is preferably from 5 to 20 μm. When the thickness of the collector is within this range, the negative electrode has sufficient strength and lightness.

The negative electrode is produced by, for example, as follows: a negative electrode material and a binder are suspended in a common solvent to make slurry, and the slurry is applied to at least one surface of a collector, and dried to form a negative electrode layer, and then pressed.

Alternatively, in the production of the negative electrode, the negative electrode material and binder may be formed into a pellet, and used the pellet as a negative electrode layer.

3) Non-aqueous Electrolyte

The non-aqueous electrolyte may be a non-aqueous electrolyte gel composed of a liquid non-aqueous electrolyte, which has been prepared by dissolving an electrolyte in an organic solvent, a liquid electrolyte, and a polymer material.

The liquid non-aqueous electrolyte is prepared by dissolving an electrolyte in an organic solvent at a concentration of 0.5 mol/L or more and 2.5 mol/L or less.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$), lithium bis(trifluoromethylsulfonylimide) [$LiN(CF_3SO_2)_2$], or mixtures thereof. The electrolyte is preferably resistant to oxidation even at high potentials, and most preferably $LiPF_6$.

Examples of the organic solvent include cyclic carbonates such as propylene carbonate (PC), ethylene carbonate (EC), and vinylene carbonate, or linear carbonates such as diethyl carbonate (DEC), dimethyl carbonate (DMC), and methylethyl carbonate (MEC), or cyclic ethers such as tetrahydrofuran (THF), 2-methyltetrahydrofuran (2-MeTHF), and dioxolane (DOX), or linear ethers such as dimethoxyethane (DME) and diethoxyethane (DEE), or γ-butyrolactone (GBL), acetonitrile (AN), sulfolane (SL), or mixtures thereof.

Examples of the polymer material include polyvinylidene fluoride (PVdF), polyacrylonitrile (PAN), and polyethylene oxide (PEO).

The non-aqueous electrolyte may be an ordinary temperature molten salt (ionic melt) containing lithium ions, a polymer solid electrolyte, or an inorganic solid electrolyte.

The term "ordinary temperature molten salt (ionic melt)" refers to an organic salt which is composed of an organic cation and an organic anion, and exists in liquid state at ordinary temperature (from 15 to 25° C.) Examples of the ordinary temperature molten salt include those existing in a liquid state by themselves, those turning into a liquid state when mixed with an electrolyte, and those turning into a liquid state when dissolved in an organic solvent. The ordinary temperature molten salts commonly used in non-aqueous electrolyte secondary batteries have a melting point of 25° C. or lower. The organic cation normally has a quaternary ammonium skeleton.

The polymer solid electrolyte is prepared by dissolving an electrolyte in a polymer material, followed by solidification.

The inorganic solid electrolyte is a solid substance having lithium ion conductivity.

4) Positive Electrode

The positive electrode comprises a collector, and a positive electrode layer formed on at least one surface of the collector and containing an active material and a binder.

Examples of the active material include oxides and sulfides. Specific examples of the active material include manganese dioxide inserting lithium ($MnO_2$), iron oxide, copper oxide, nickel oxide, lithium manganese complex oxides (for example, $Li_xMn_2O_4$ and $Li_xMnO_2$), lithium nickel complex oxides (for example $Li_xNiO_2$), lithium cobalt complex oxides (for example $Li_xCoO_2$), lithium nickel cobalt complex oxides (for example $LiNi_{1-y}Co_yO_2$), lithium manganese cobalt complex oxides (for example $Li_xMn_yCo_{1-y}O_2$), spinel lithium manganese nickel complex oxides ($Li_xMn_{2-y}Ni_yO_4$), olivine-type lithium phosphate oxides (for example, $Li_xFePO_4$, $Li_xFe_{1-y}Mn_yPO_4$, and $Li_xCoPO_4$), iron sulfate [$Fe_2(SO_4)_3$], and vanadium oxides (for example, $V_2O_5$). The x and y preferably satisfy $0<x\le1$ and $0<y\le1$, respectively.

Examples of the active material giving a high positive electrode voltage include lithium manganese complex oxides ($Li_xMn_2O_4$), lithium nickel complex oxides ($Li_xNiO_2$), lithium cobalt complex oxides ($Li_xCoO_2$), lithium nickel cobalt complex oxides ($LiNi_{1-y}Co_yO_2$), spinel lithium manganese nickel complex oxides ($Li_xMn_{2-y}Ni_yO_4$), lithium manganese cobalt complex oxides ($Li_xMn_yCo_{1-y}O_2$), lithium iron phosphates ($Li_xFePO_4$), and lithium nickel cobalt manganese complex oxides. The x and y preferably satisfy $0<x\le1$ and $0<y\le1$, respectively.

Among them, when the non-aqueous electrolyte contains an ordinary temperature molten salt, the use of lithium iron phosphate, $Li_xVPO_4F$, lithium manganese complex oxide, lithium nickel complex oxide, and lithium nickel cobalt complex oxide is preferred from the viewpoint of cycle life, thereby decreasing the reactivity between the positive electrode active material and ordinary temperature molten salt. The primary particle size of the positive electrode active material is preferably 100 nm or more and 1 μm or less. The positive electrode active material having a primary particle size of 100 nm or more is easy to handle in the industrial production. The positive electrode active material having a primary particle size of 1 μm or less allows smooth diffusion of lithium ions in the solid.

The specific surface area of the active material is preferably 0.1 m²/g or more and 10 m²/g or less. The active material having a specific surface area of 0.1 m²/g or more has sufficient sites for occluding and emitting lithium ions. The active material having a specific surface area of 10 m²/g or less is easy to handle in the industrial production, and offers good charge and discharge cycle performance.

Examples of the binder for binding the active material with the collector include polytetrafluoroethylene (PTFE), polyvinylidene fluoride (PVdF), and fluorine rubber.

A conductive agent may be added as necessary for improving the collecting performance and reducing the contact resistance of the positive electrode layer to the collector. Examples of the conductive agent include carbon materials such as acetylene black, carbon black, and graphite.

The proportion of the active material is preferably 80% by weight or more and 98% by weight or less, and the proportion of the binder is preferably 2% by weight or more and 20% by weight or less. When the proportion of the binder is 2% by weight or more, sufficient electrode strength is achieved, and when 20% by weight or less, the content of the insulator in the electrode is decreased, whereby the internal resistance is decreased.

When the amount of the conductive agent is 3% by weight or more, the addition effect of the conductive agent is achieved, and when 15% by weight or less, decomposition of the non-aqueous electrolyte on the surface of the conductive agent during storage at high temperatures is reduced.

The collector is preferably an aluminum foil or an aluminum alloy foil.

The average thickness of the aluminum foil or aluminum alloy foil is 5 μm or more and 20 μm or less, and more preferably 15 μm or less. The purity of the aluminum foil is preferably 99% by weight or more. The aluminum alloy preferably contains magnesium, zinc, silicon, or other element. The content of the transition metal such as iron, copper, nickel, or chromium in the aluminum foil or aluminum alloy foil is preferably 1 wt % or less.

The positive electrode is produced by, for example, as follows: an active material, a binder, and a conductive agent that is added as necessary are suspended in an appropriate solvent to make slurry, the slurry is applied to at least one surface of a collector, and dried to form a positive electrode layer, followed by pressing.

Alternatively, in the production of the positive electrode, the active material, binder, and conductive agent, which is added as necessary, may be formed into a pellet, and used the pellet as a positive electrode layer.

5) Separator

Examples of the separator include porous films and synthetic resin nonwoven fabrics containing polyethylene, polypropylene, cellulose, or polyvinylidene fluoride (PVdF). Among them, porous film made of polyethylene or polypropylene is preferred thereby achieving a higher level of safety, because they are molten at a specific temperature to break the electric current.

The above-described electrode group including the negative electrode, positive electrode, and separator may have a winding structure or a laminated structure.

Figure 2:
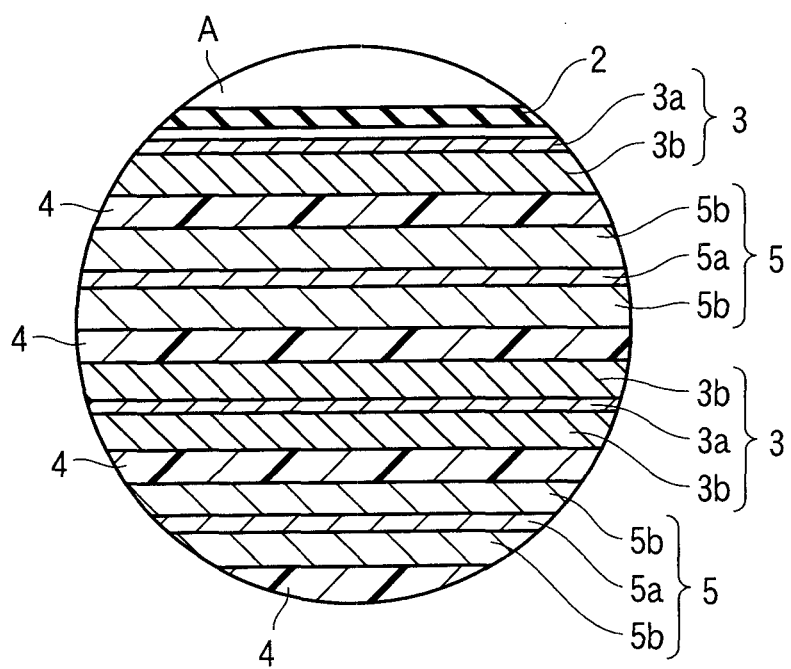
FIG. 2 is an enlarged cross-sectional view of the section A of FIG. 1.

The non-aqueous electrolyte secondary battery of the third embodiment is described below in more detail with reference to FIGS. 1 and 2. FIG. 1 is a cross-sectional view of the thin-type non-aqueous electrolyte secondary battery of the third embodiment, and FIG. 2 is an enlarged cross-sectional view of the section A of FIG. 1.

A flattened wound electrode group 1 is contained in a bag-like outer container 2 which is made of a laminate film composed of two layers of resin film sandwiching a metal layer. The flattened wound electrode group 1 is formed by spirally winding and press-forming a laminate which is composed of, from the outside to the inside, a negative electrode 3, a separator 4, a positive electrode 5, and a separator 4. As shown in FIG. 2, the outermost negative electrode 3 is composed of a negative electrode collector 3a and a negative electrode layer 3b which is formed on one surface of the negative electrode collector 3a and contains the above-described a negative electrode material, the other portion of the negative electrode 3 is composed of the negative electrode collector 3a and negative electrode layers 3b formed on both surfaces of the negative electrode collector 3a. The positive electrode 5 is composed of a positive electrode collector 5a and positive electrode layers 3b formed on both surfaces of the positive electrode collector 5s.

Near the outer peripheral edge of the flattened wound electrode group 1, a negative terminal 6 is connected to the negative electrode collector 3a of the outermost negative electrode 3, and a positive terminal 7 is connected to the positive electrode collector 5a of the inner positive electrode 5. These negative terminal 6 and positive terminal 7 extend from the opening of the bag-like outer container 2 to the outside. For example, a liquid non-aqueous electrolyte is injected through the opening of the bag-like outer container 2. The opening of the bag-like outer container 2 is heat-sealed with the negative terminal 6 and positive terminal 7 sandwiched between two flanges, thereby completely sealing the flattened wound electrode group 1 and liquid non-aqueous electrolyte.

The negative terminal may be made of a material which is electrochemically stable at the potentials at which lithium is inserted and extracted in the negative electrode material, and has conductivity. Specific examples of the material include copper, nickel, stainless steel, and aluminum. In order to reduce the contact resistance, the material is preferably same as the material of the negative electrode collector.

The positive terminal may be made of a material having electrical stability and conductivity when the potential for the lithium ion metal is 3 V or more and 5 V or less. Specific examples of the material include aluminum and aluminum alloys containing Mg, Ti, Zn, Mn, Fe, Cu, Si, or other element. In order to reduce the contact resistance, the material is preferably the same as the material of the positive electrode collector.

Figure 3:
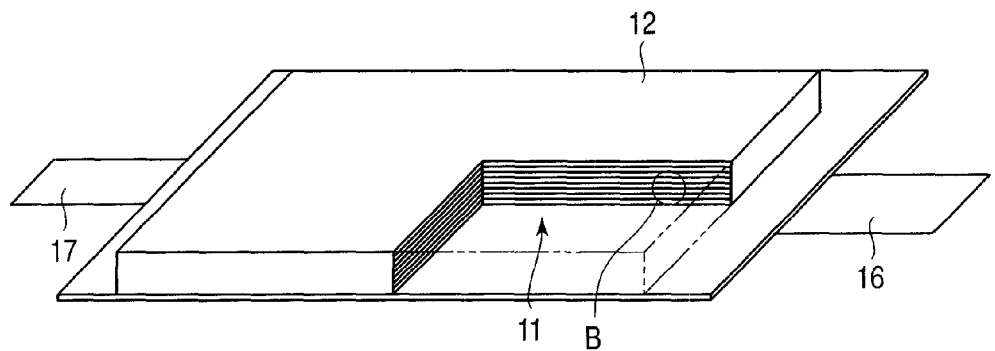
FIG. 3 is a partially cutaway perspective view schematically illustrating another flat non-aqueous electrolyte secondary battery of the third embodiment.
Figure 4:
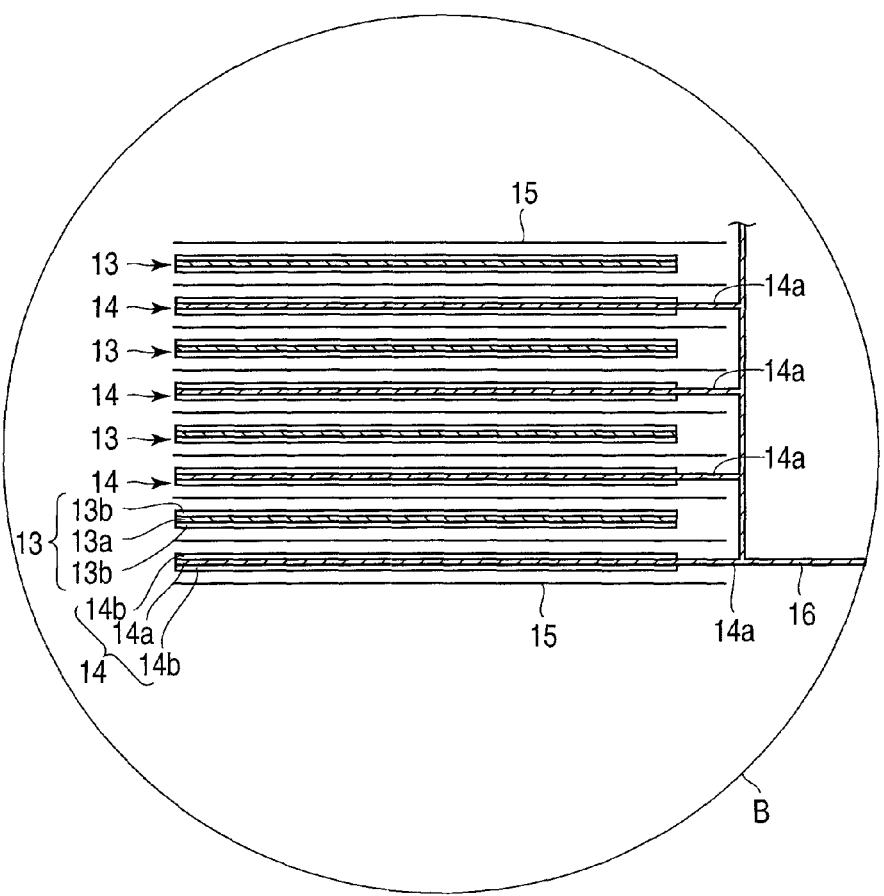
FIG. 4 is an enlarged cross-sectional view of the section B of FIG. 3.

The non-aqueous electrolyte secondary battery of the third embodiment may have the structure shown in FIGS. 1 and 2, or the structure shown in FIGS. 3 and 4. FIG. 3 is a partially cutaway perspective view schematically illustrating another flat non-aqueous electrolyte secondary battery according to the third embodiment, and FIG. 4 is an enlarged cross-sectional view of the section B of FIG. 3.

A laminated electrode group 11 is contained in an outer container 12 made of a laminate film composed of two layers of resin film sandwiching a metal layer. As shown in FIG. 4, the laminated electrode group 11 is composed of a positive electrode 13, a negative electrode 14 and which are alternately stacked with a separator 15 therebetween. The number of the positive electrode 13 is plural, and each of them includes a collector 13a and positive electrode layers 13b formed on both surfaces of the collector 13a. The number of the negative electrode 14 is plural, and each of them includes a collector 14a and negative electrode layers 14b formed on both surfaces of the collector 14a. One side of the collector 14a of the negative electrode 14 projects from the positive electrode 13. The projected collector 14a is electrically connected to a band-like negative terminal 16. The tip of the band-like negative terminal 16 extends to the outside from a outer container member 11. Although not shown, the collector 13a of the positive electrode 13 is projected from the negative electrode 14 at the side opposed to the projecting side of the collector 14a. The collector 13a projected from the negative electrode 14 is electrically connected to a band-like positive terminal 17. The tip of the band-like positive terminal 17 is located opposed to the negative terminal 16, and extending to the outside from one side of the outer container member 11.

The non-aqueous electrolyte secondary battery according to third embodiment includes a negative electrode which comprises a collector and a negative electrode layer formed on at least one surface of the collector. The negative electrode layer includes a negative electrode material which has been described in the first embodiment and comprises a porous conductive particle and an active material formed on the surface and/or within the pores of the porous conductive particle and composed of a lithium titanium complex oxide having at least one structure selected from the group consisting of nanotubes and nanowires, the lithium titanium complex oxide being expressed by a general formula $Li_xTiO_2$ (where $0 \leq x < 1$). Such lithium titanium complex oxide exhibits an electrode potential of near 1.5 V with reference to lithium, which is equivalent to that of a titanate material, and having a higher energy density than the material. Therefore, the non-aqueous electrolyte secondary battery having stable repeated quick charge and discharge performance is provided.

(Fourth Embodiment)

In general, according to fourth embodiment, a battery pack comprises a plurality of the non-aqueous electrolyte secondary batteries described in the third embodiment, the batteries being connected in series, parallel or series and parallel.

The battery pack is described in detail with reference to FIGS. 5 and 6. The single cell may be the flat battery shown in FIG. 1.

A plurality of single cells 21 composed of the above-described thin-type non-aqueous electrolyte secondary batteries shown in FIG. 1 are stacked such that negative terminals 6 and positive terminals 7 extending to the outside are aligned in the same direction, and fastened by an adhesive tape 22 to make a battery set 23. As shown in FIG. 6, these single batteries 21 are electrically connected to each other in serial.

A printed circuit board 24 is arranged opposed to the single batteries 21 at the side from which the negative terminal 6 and positive terminal 7 are extended. As shown in FIG. 6, a thermistor 25, a protection circuit 26, and an energizing terminal 27 for passing a current to the external equipment are mounted on the printed circuit board 24. An insulating plate (not shown) is mounted on the protective circuit board 24 on the side opposed to the battery set 23, thereby avoiding unnecessary connection with the lines of the battery set 23.

A positive electrode lead 28 is connected to a positive terminal 7 located at the bottom of the battery set 23, and the tip of the positive electrode lead 28 is inserted into and electrically connected to a positive electrode connector 29 of the printed circuit board 24. The negative electrode lead 30 is connected to the negative terminal 6 located at the top of the battery set 23, and the tip of the negative electrode lead 30 is inserted into and electrically connected to a negative electrode connector 31 of the printed circuit board 24. These connectors 29 and 31 are connected to the protection circuit 26 through lines 32 and 33 formed on the printed circuit board 24.

The thermistor 25 detects the temperature of the single batteries 21, and the detection signal is sent to the protection circuit 26. The protection circuit 26 blocks a positive line 34a and a negative line 34b between the protection circuit 26 and the energizing terminal 27 for passing a current to the external equipment under predetermined conditions. The predetermined conditions refer to, for example, the point where the temperature detected by the thermistor 25 reaches or exceeds the predetermined temperature. Other predetermined conditions refer to the point when overcharge or overdischarge or overcurrent in the single batteries 21 is detected. The detection of overcharge and others is carried out for the individual or whole single batteries 21. When the detection is carried out for individual single batteries 21, the battery voltage may be detected, or the positive or negative electrode potential may be detected. In the latter case, a lithium electrode used as a reference electrode is inserted into each of the single batteries 21. In the case shown in FIGS. 5 and 6, a line 35 for voltage detection is connected to each of the single batteries 21, and detection signals are sent to the protection circuit 26 through the line 35.

Protective sheets 36 made of a rubber or resin are arranged on the three sides of the battery set 23 excluding the side from which the positive terminal 7 and negative terminal 6 are projected.

The battery set 23 is contained in a container 37 together with the protective sheets 36 and printed circuit board 24. More specifically, the protective sheets 36 are arranged on both the inner long sides and one of the inner short sides of the container 37, and the printed circuit board 24 is arranged on the opposite inner short side. The battery set 23 is located in the space surrounded by the protective sheet 36 and printed circuit board 24. A cover 38 is placed on the top of the container 37.

Heat-shrinkable tape may be used in place of the adhesive tape 22 for fixing the battery set 23. In this case, the protective sheets are arranged at both sides of the battery set, and the battery set is bound by a heat-shrinkable tape, and then the heat-shrinkable tape is heat-shrunk to bundle the battery set.

Figure 6:
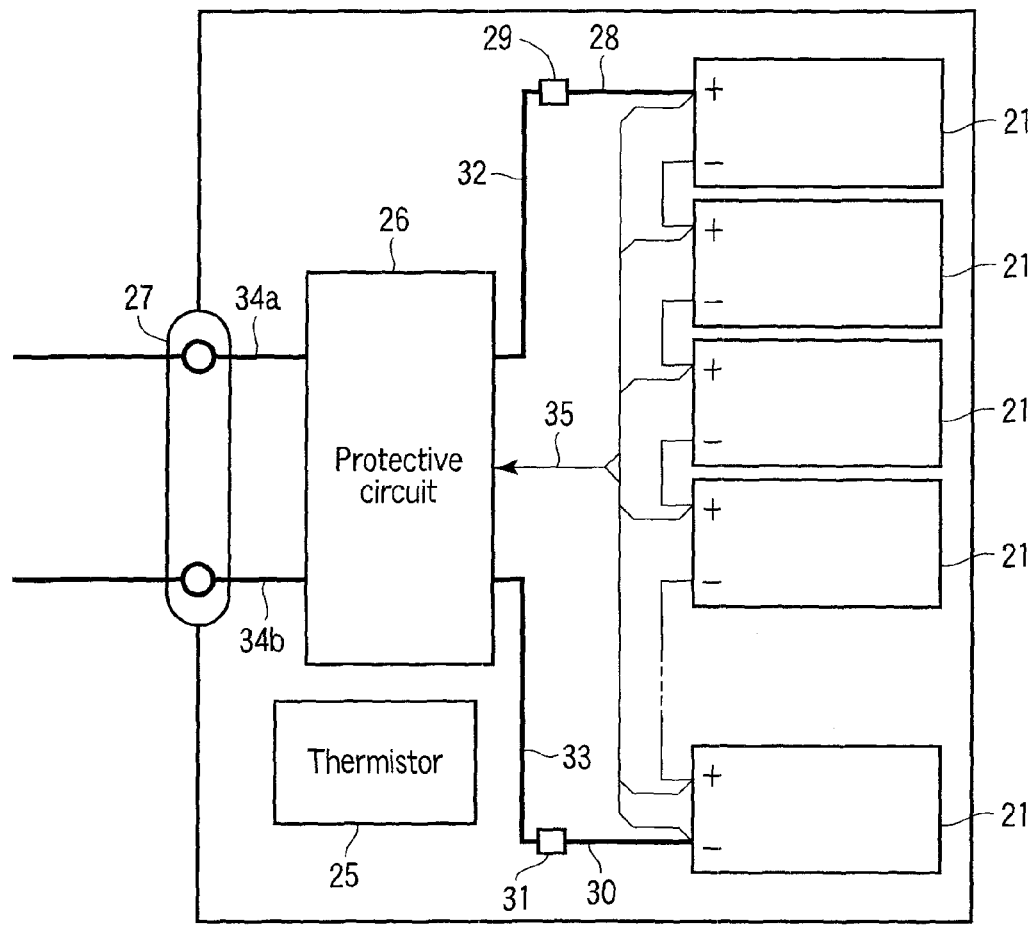
FIG. 6 is a block diagram illustrating the circuit of the battery pack shown in FIG. 5.

FIGS. 5 and 6 show an embodiment wherein the single batteries 21 are connected in series. In order to increase the battery capacity, the batteries may be connected in parallel. The battery pack thus assembled may be connected in series and parallel.

The fourth embodiment of the battery pack is changed according to the intended use. The battery pack is preferably used in applications where cycling characteristics at large currents are required. Specific examples of the applications include power sources for digital cameras, and vehicle-mounted batteries for two- or four-wheel hybrid electric vehicles, two- or four-wheel electric vehicles, and motor-assisted bicycles. Vehicle-mounted batteries are particularly preferred.

The present invention is further described on the basis of examples, but the present invention will not be limited to these examples. The identification of the crystal phase and the prediction of the crystal structure obtained by reactions were carried out by powder x-ray diffractometry using Cu-Kα radiation, and the specific surface area was measured by the above-described BET method. The composition of the product was analyzed by ICP, and confirmed to be the intended object.

Synthesis of Negative Electrode Material 1

Carbon black having a hollow shell structure (Ketjen Black EC600, trademark) was dispersed a mixed solution of titanium isopropoxide and 2-propanol, the mixture was stirred, and then subjected to reduced pressure. At that time, the hollow shells of the carbon black was impregnated with a titanium isopropoxide solution. The carbon black had a specific surface area of 900 $m^2$/g as measured by the BET method, and a particle size of 39.5 nm. After sufficient impregnation was achieved, the mixture was stirred while an aqueous solution containing ethanol and pure water was slowly dropped, and hydrolysis reaction was carried out to form carbon black containing titanium gel. Subsequently, the excessive portion of the titanium isopropoxide solution was removed by filtration. After drying at room temperature for 12 hours, the carbon black was dried at 60° C. for 24 hours, and burned at 400° C. for 5 hours in an argon atmosphere. At that time, the titanium gel was converted to titanium dioxide.

Subsequently, 1 g of the composite material of titanium dioxide and carbon black thus obtained was placed in a mixed solution of 60 mL of sodium hydroxide aqueous solution, which had been adjusted to a concentration of 10 mol/L, and 60 mL of ethanol, and thoroughly dispersed under stirring. The dispersion was transferred to a 150 mL autoclave pressure vessel made of stainless steel having a polytetrafluoroethylene inner wall, and heated at 180° C. for 24 hours. After cooling to room temperature, the product was washed with 0.5M of hydrochloric acid, and then washed with water. These objects were placed in a vacuum dryer, and dried at 80° C. for 12 hours. Thereafter, the sample was heated at 350° C. for 12 hours, thereby producing a composite material (negative electrode material) composed of carbon black combined with nanotubes and nanowires of titanium dioxide.

Figure 7:
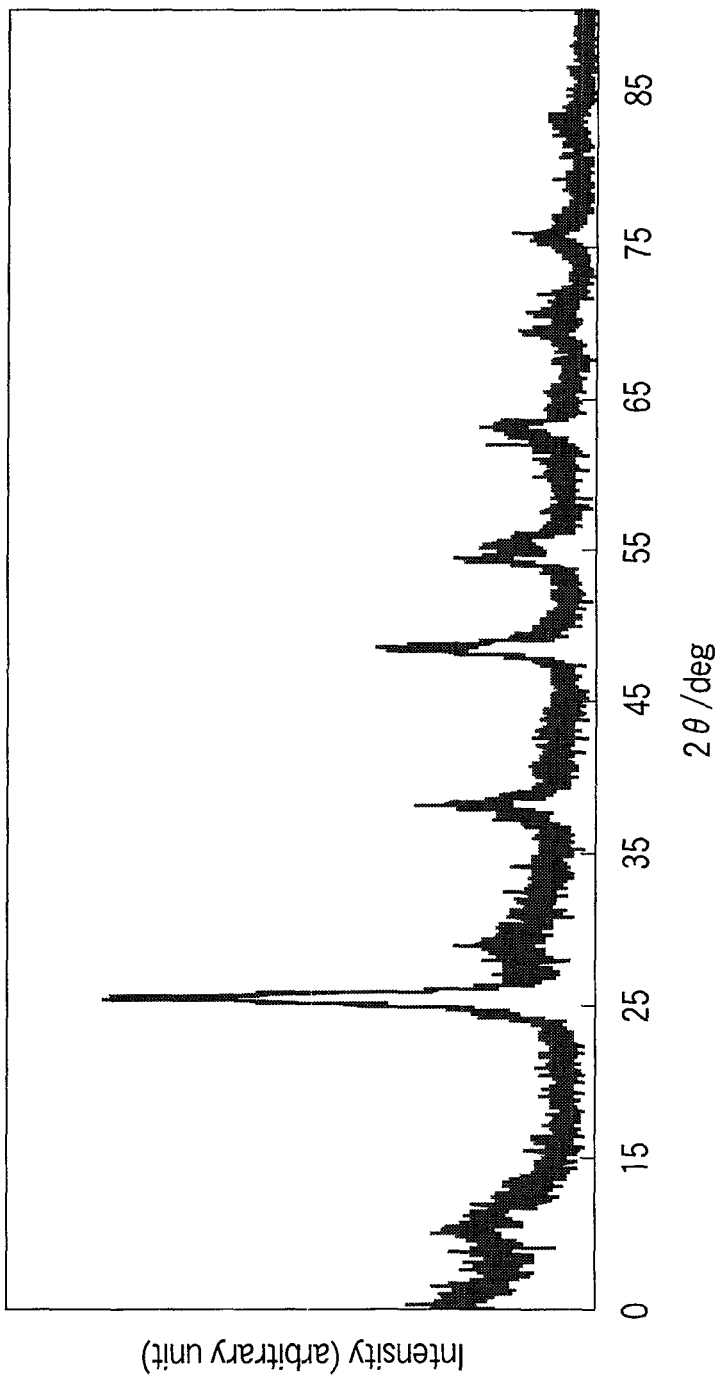
FIG. 7 shows a powder Cu-KαX-ray diffraction pattern of the composite material (negative electrode material) composed of the anatase titanium dioxide nanotubes and porous carbon obtained in Synthesis Example 1.

The result of powder X-ray diffractometry of the negative electrode material using Cu—Kα radiation is shown in FIG. 7. The measurement was carried out at a scanning rate of 3 deg/min, a step width of 0.2 deg, a tube voltage of 40 kV, and a tube current of 20 mA. The result indicates the formation of anatase titanium oxide ($TiO_2$). On the other hand, a black color of carbon black was confirmed by the visual observation of the sample. These facts suggest that the peak of the diffraction line is due to the reflection of titanium oxide captured in the pores.

Figure 8:
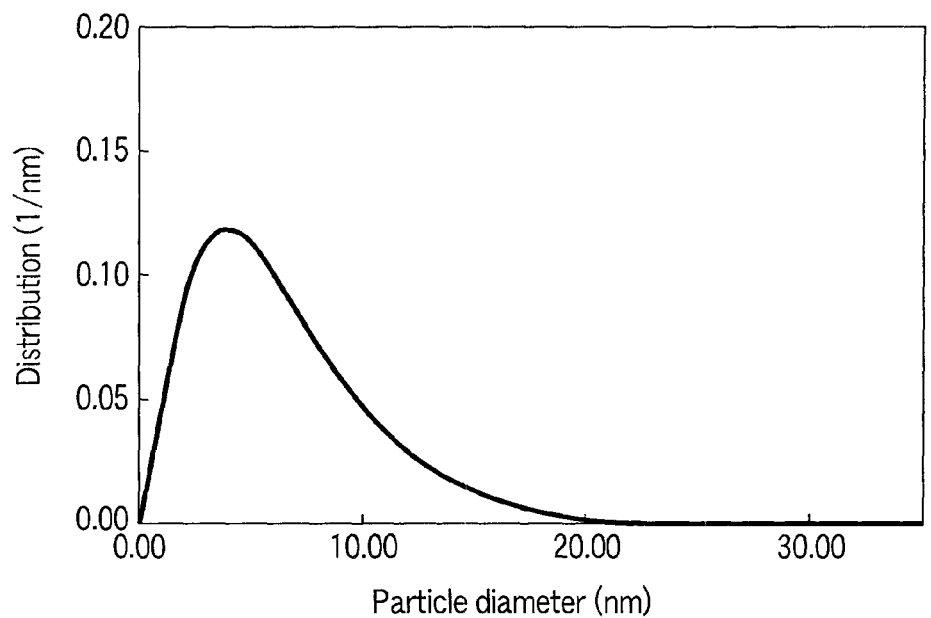
FIG. 8 shows a particle size distribution obtained from the X-ray small-angle scattering analysis of the composite material (negative electrode material) obtained in Synthesis Example 1.

The particle size distribution obtained from the X-ray small-angle scattering analysis of the sample is shown in FIG. 8. The measurement was carried out using RINT 2500 manufactured by Rigaku Corporation. The X ray source was operated at 50 kV and 300 mA using Cu as its target. The measurement used a step scanning method (FT method), and the step interval was 0.005°, measuring time was 5 seconds, and the scanning range was from 0.06 to 5.00°. Since the measurement was based on a permeation method, the measurement sample was charged into a polyethylene terephthalate (PET) film bag, and mounted on a special holder. Before the analysis, the blank information obtained by measuring the PET film alone was deducted thereby excluding the influence of the PET film.

The measurement result showed that the average particle size was 7.03 nm as measured by the X-ray small-angle scattering analysis using Cu—Kα radiation, the peak rose sharply in the range from 1 to 10 nm, but the particle size distributed a range from 0.05 to 21.0 nm. The particle size distributed towards the high angle side with reference to the peak position in a particle size distribution, indicating that the sample is a composite material composed of titanium oxide and porous conductive particles having a uniform average particle size and a uniform aspect ratio owing to the effect of combination with carbon. The $TiO_2$ combined with carbon prevents secondary aggregation of particles, and provides fine uniformity of the particle size in comparison with the $TiO_2$ particles alone. Therefore, nanotubes having a sharp particle size distribution are obtained.

<Synthesis of Negative Electrode Material 2>

Nanotubes and nanowires of titanium dioxide were synthesized as known materials. Specifically, commercially available titanium dioxide fine particles (average particle size: 100 nm) were used as the starting material. 1 g of the titanium dioxide fine particles was placed in a mixed solution of 60 mL of sodium hydroxide aqueous solution, which had been adjusted to a concentration of 10 mol/L, and 60 mL of ethanol, and thoroughly dispersed under stirring. The dispersion was transferred to a 150 mL autoclave pressure vessel made of stainless steel having a polytetrafluoroethylene inner wall, and heated at 180° C. for 24 hours. After cooling to room temperature, the product was washed with 0.5M hydrochloric acid, and then washed with water. These objects were placed in a vacuum dryer, and dried at 80° C. for 12 hours.

Thereafter, the sample was heated at 350° C. for 12 hours, and thereby producing nanotubes and nanowires. The result of the powder X-ray diffractometry of the material was very similar to that shown in FIG. 7, and the formation phase of the active material was anatase titanium oxide.

Acetylene black as a conductive additive was added to the nanotubes and nanowires of anatase titanium oxide, and mixed in a mortar.

Figure 9:
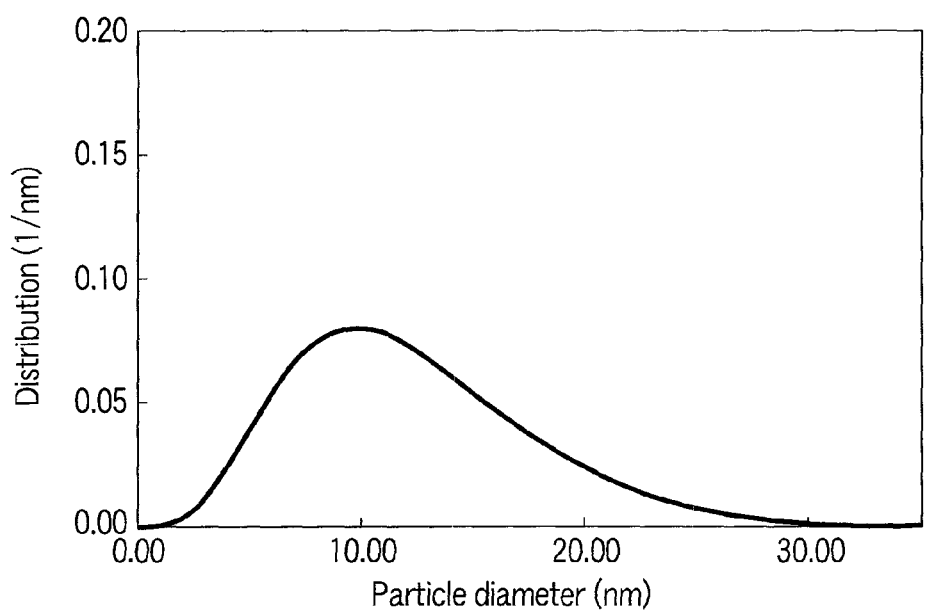
FIG. 9 shows a particle size distribution obtained from the X-ray small-angle scattering analysis of the composite material (negative electrode material) obtained in Synthesis Example 2.

The result of the X-ray small-angle scattering analysis of the mixture is shown in FIG. 9. The measurement result showed a broad peak with an average particle size of 12.25 nm as measured by the X-ray small-angle scattering analysis using Cu-Kα radiation, the peak extending over the range from 1 to 20 nm. It was also found that the particle size distribution extended over the range from 1.7 to 29.0 nm, and was composed of a mixture of carbon black and titanium oxide having distributed particle sizes and aspect ratios.

<Example 1 and Comparative Example 1>

The negative electrode material particle obtained in Synthesis Example 1 or 2 was mixed with 10% (weight ratio) of polytetrafluoroethylene as a binder. These mixtures were dispersed in NMP (n-methylpyrrolidone) to prepare slurries. These slurries were individually applied to the surface of an aluminum foil using a doctor blade to form coating films having a thickness of about 100 μm. Subsequently, these films were dried at 80° C. for 12 hours under reduced pressure, and cut into 4 cm² squares, thereby making electrodes (negative electrodes).

Metal lithium foils were used as the counter electrodes for these electrodes. A glass filter as a separator was sandwiched between the electrode and metal lithium foil to make an electrochemical measurement cell. The electrolyte was a 1 M solution of lithium hexafluorophosphate in ethylene carbonate.

The electrochemical measurement cell includes a counter electrode made of lithium metal, so that the electrode potential is noble to the counter electrode. Therefore, the charge and discharge directions are opposite to those when the electrode is used as the negative electrode. In order to avoid confusion, the insertion of lithium ions into the electrode is referred to charge, and the extraction of lithium ions is referred to as discharge.

<Evaluation of Initial Charge And Discharge Capacity>

The electrochemical measurement cells of Example 1 and Comparative Example 1 were subjected to charge and discharge test at room temperature in the potential range of 1.0 to 2.5V relative to the metal lithium electrode. The initial charge and discharge curves of the measurement cells of Example 1 and Comparative Example 1 are shown in FIG. 10. As is evident from FIG. 10, the comparison between the charge and discharge curves of the measurement cells of Example 1 and Comparative Example 1 indicates that the charge and discharge capacities of the measurement cell of Example 1 were higher than those of the measurement cell of Comparative Example 1.

The proportion of the initial charge and discharge capacities (initial charge and discharge efficiency) was as high as 81% for the measurement cell of Example 1, and as low as 68% for the measurement cell of Comparative Example 1. These results are owing to the effect of the combination of carbon with the nanotubes and nanofibers, which are negative electrode materials contained in the electrode of Example 1, and indicate that higher charge and discharge capacities and charge and discharge efficiency were achieved in comparison with the negative electrode material contained in the electrode of Comparative Example 1, which was made by simple mixing with carbon.

<Evaluation of Charge And Discharge Cycling Characteristics>

Subsequently, the electrochemical measurement cells of Example 1 and Comparative Example 1 were measured for the discharge capacity retention rate while charge and discharge were repeated at room temperature and in the potential range of 1.0 to 2.5V relative to the metal lithium electrode. The capacity retention rate is shown in FIG. 11, with the initial discharge capacity as 100% when the current value was 0.5 mA/cm$^2$.

As is evident from FIG. 11, the measurement cell of Example 1 including an electrode containing a negative electrode material composed of anatase titanium dioxide nanotubes/nanowires having specific I(0) and Rg in the X-ray small-angle scattering analysis exhibited a higher capacity retention rate than the measurement cell of Comparative Example 1. It is evident that the measurement cell of Comparative Example 1 including an electrode containing a negative electrode material prepared by simply mixing carbon black and titanium dioxide nanotubes/nanowires has low durability in repeated charge and discharge.

The embodiments are described above, but the invention will not be limited to these embodiments, and may be subjected to various modifications without departing from the scope of the claims herein. The present invention may be subjected to various modifications during the implementation phase without departing from the scope of the invention. Further, a plurality of the components disclosed in the above-described embodiments may be combined as appropriate to form various aspects of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode material for a nonaqueous electrolyte secondary battery, comprising a porous conductive particle and an active material which inserts and extracts lithium ions and is formed on the surface and within the pores of the porous conductive particle,
wherein the active material being composed of a lithium titanium complex oxide having at least one structure selected from the group consisting of nanotubes and nanowires,
the lithium titanium complex oxide being expressed by a general formula $Li_xTiO_2$ (where $0 \leq x < 1$) and
the nanotubes or nanowires have an average diameter of 5 nm or more and 50 nm or less.

2. The negative electrode material of claim 1, wherein the active material exhibits a peak in the average particle size range of 1 nm or more and 10 nm or less as measured by X-ray small-angle scattering analysis using Cu—K∀ radiation and having a particle size which is distributed a range of 0.01 nm or more and 30 nm or less and distributed towards the high angle side with reference to the peak position in a particle size distribution.

3. The negative electrode material of claim 1, wherein the porous conductive particle is carbon or conductive oxide particles having an average particle size of 10 pm or more and 50 pm or less.

4. The negative electrode material of claim 1, which has a specific surface area of 200 m$^2$/g or more and 400 m$^2$/g or less as measured by the BET method.

5. The negative electrode material of claim 1, which has a tap density of 0.3 g/cm$^3$ or more and 1.1 g/cm$^3$ or less.

6. A non-aqueous electrolyte secondary battery comprising:
a positive electrode which inserts and extracts lithium ions;
a negative electrode containing a negative electrode material which comprises a porous conductive particle and an active material which inserts and extracts lithium ions and is formed on the surface and within the pores of the porous conductive particle, and
a non-aqueous electrolyte
wherein the active material in the negative electrode material is composed of a lithium titanium complex oxide having at least one structure selected from the group consisting of nanotubes and nanowires,
the lithium titanium complex oxide is expressed by a general formula $Li_xTiO_2$ (where $0 \leq x < 1$), and
the nanotubes or nanowires have an average diameter of 5 nm or more and 50 mn or less.

7. The secondary battery of claim 6, wherein the active material exhibits a peak in the average particle size range of 1 nm or more and 10 nm or less as measured by X-ray small-angle scattering analysis using Cu—K∀ radiation and having a particle size which is distributed a range of 0.01 nm or more and 30 nm or less and distributed towards the high angle side with reference to the peak position in a particle size distribution.

8. A battery pack including a plurality of the non-aqueous electrolyte secondary batteries according to claim 6, the batteries being connected in series, parallel, or series and parallel.

9. The negative electrode material of claim 1, wherein said structure is nanotubes.

10. The negative electrode material of claim 1, wherein said structure is nanowires.

11. The negative electrode material of claim 1, wherein the active material is formed within the pores of the porous conductive particle.

12. The secondary battery of claim 6, wherein said structure is nanotubes.

13. The secondary battery of claim 6, wherein said structure is nanowires.

14. The secondary battery of claim 6, wherein the active material is formed within the pores of the porous conductive particle.

* * * * *